Aug. 30, 1949.

C. E. COLE ET AL 2,480,357

FRUIT PITTING MACHINE

Filed Dec. 15, 1945

Inventors
CARROLL E. COLE
EDWARD J. DERDERIAN

By Lyon & Lyon
Attorneys

Aug. 30, 1949.                C. E. COLE ET AL                 2,480,357
                              FRUIT PITTING MACHINE
Filed Dec. 15, 1945                                         3 Sheets-Sheet 2

Inventors
CARROLL E. COLE
EDWARD J. DERDERIAN
By Lyon & Lyon
Attorneys

Aug. 30, 1949.  C. E. COLE ET AL  2,480,357
FRUIT PITTING MACHINE

Filed Dec. 15, 1945  3 Sheets-Sheet 3

Inventors
CARROLL E. COLE
EDWARD J. DERDERIAN
By Lyon & Lyon
Attorneys

Patented Aug. 30, 1949

2,480,357

UNITED STATES PATENT OFFICE 2,480,357

FRUIT PITTING MACHINE

Carroll E. Cole and Edward J. Derderian, Fresno, Calif., assignors to Elliott Manufacturing Company, Fresno, Calif., a corporation of California Application December 15, 1945, Serial No. 635,298

4 Claims. (Cl. 146—76)

Our invention relates to fruit pitting machines, and the objects of our invention are:

First: To provide a machine which may be employed to remove the pits of different kinds of fruit, such as plums, prunes, apricots, peaches (particularly those of small size) and cherries.

Second: To provide a machine of this class, wherein the pits are thoroughly cleaned of pulp during the course of removal thereby providing a machine which is particularly applicable to the pitting of fruits in which the pit is not "free" of the pulp.

Third: To provide a machine of this class, wherein the pulp as removed is in a form suitable for compote use, and wherein virtually all of the juice extracted in the course of pitting is collected.

Fourth: To provide a machine of this character which is particularly compact and economical of manufacture in proportion to the quantity or volume of fruit it is capabale of processing.

With the foregoing and other objects in view, as may appear hereinafter, reference is directed to the accompanying drawings in which.

Figure 1:
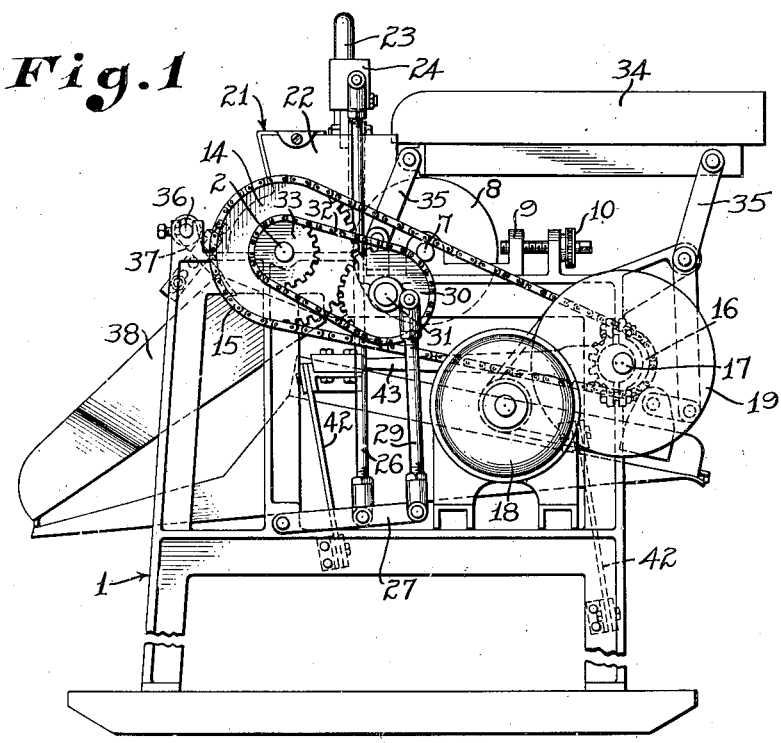
Fig. 1 is a side view of our fruit pitting machine.
Figure 2:
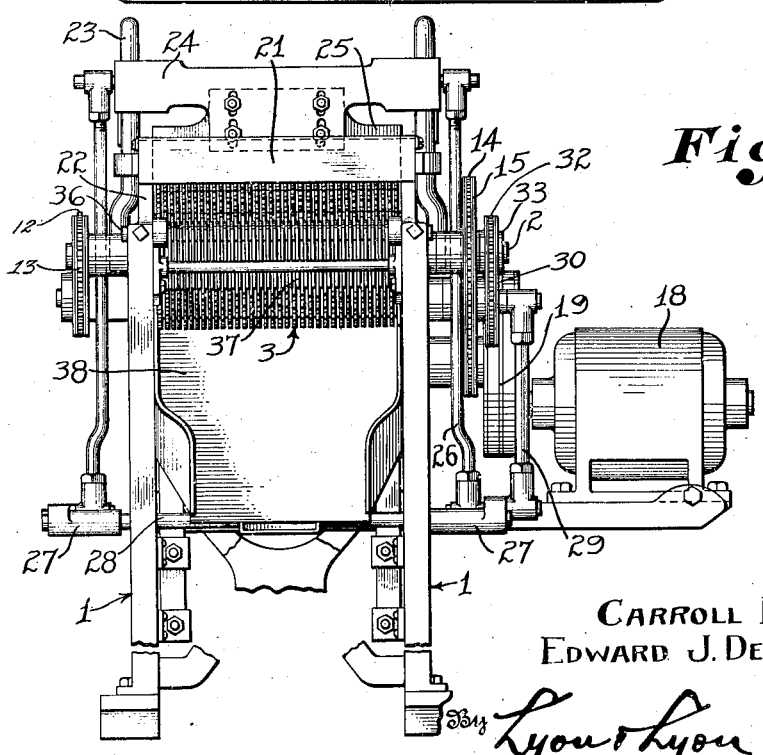
Fig. 2 is a rear or discharge end view of our machine.
Figure 3:
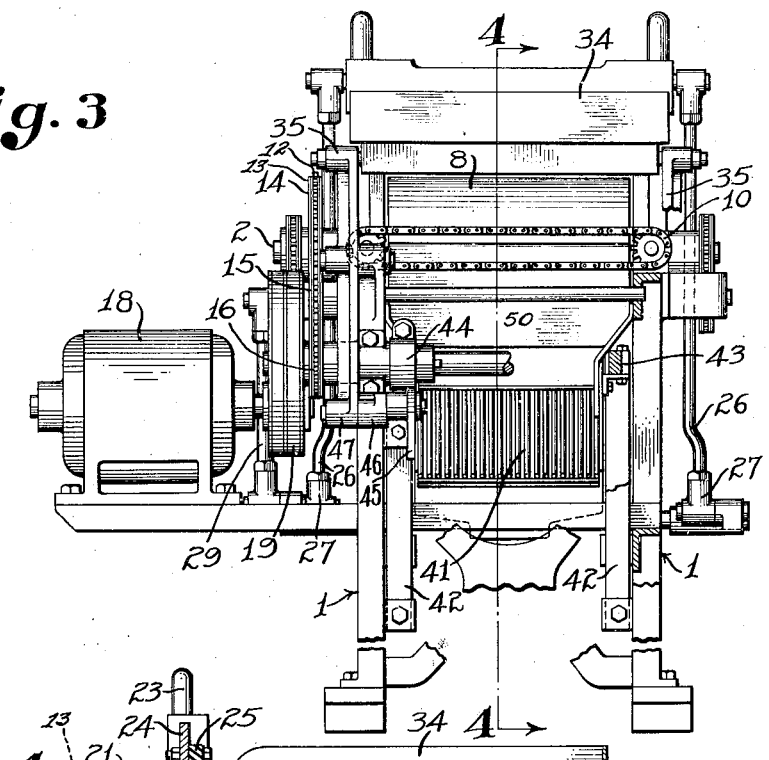
Fig. 3 is a front or receiving end view of our machine.
Figure 4:
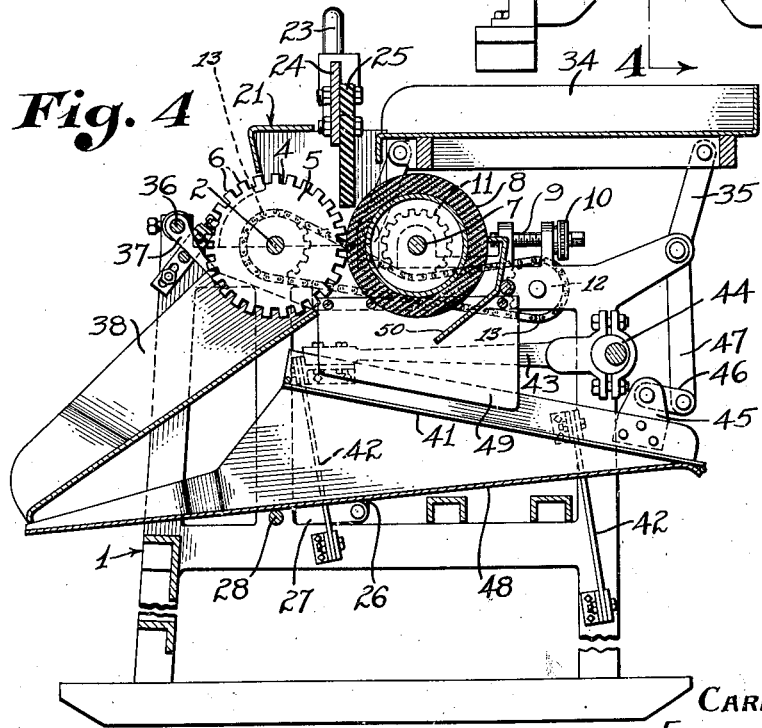
Fig. 4 is a longitudinal sectional view thereof taken substantially along the line 4—4 of Fig. 3.

The fruit pitting machine is supported by a pair of side frames 1, each comprising uprights and suitable cross members located to support the various elements of the machine. Journaled on a shaft 2 between bearings located on the upper portions of the side frames 1, near their rear ends, is a pitting roller 3. The pitting roller comprises a series of spacers 4 and circular saws 5 arranged alternately. The saws 5 have blunt or square teeth 6, which protrude beyond the spacers 4. Also supported between the side frames 1 on a shaft 7 and located forwardly of the pitting roller 3 is a pressure roller 8. The surface of the pressure roller is formed of rubber, or so-called synthetic rubber, and is relatively yieldable. The ends of the shaft 7 are mounted in slidable bearings 9 which are adapted to be moved backwardly and forwardly by a chain drive 10 in such a manner that the contact pressure of the pressure roller 8 against the pitting roller 3 may be adjusted.

The shafts 2 and 7 are provided with sprockets 11, and located forwardly of the pitting roller is an idler sprocket 12. A chain 13 passes over the idler sprocket and over the sprocket on shaft 2 but extends under the sprocket on shaft 7. The size of the sprockets 11 is identical and so are the diameters of the pitting roller 3 and pressure roller 8. Consequently the contacting sides of the pitting and pressure rollers move in the same direction and at the same peripheral speed, avoiding any tearing action between the saws and the pressure roller.

A driven sprocket 14 is mounted on the shaft 2, preferably at the opposite end from the sprocket 11. The driven sprocket 14 is connected by a drive chain 15 to a drive sprocket 16 mounted on a counter shaft 17 located across the forward ends of the side frames 1. The counter shaft 17 is in turn driven by a motor 18 through a pulley and belt unit 19.

Mounted above the rollers 3 and 8 is a feed trough 21, the bottom of which is defined by the upper adjacent portions of the rollers. The end walls 22 of the feed trough conform to the rollers 3 and 8 and support upstanding guide rods 23 between which is mounted a cross bar 24 adapted to slide vertically on the guide rods 23. The cross bar 24 supports a feeding blade 25 formed of a relatively stiff block of rubber or the like. The feeding blade is adapted to reciprocate vertically between a lower position, almost contacting simultaneously the rollers 3 and 8, and an upper position sufficiently clear thereof to permit fruit to roll under the feeding blade.

The ends of the cross bar 24 are connected by push rods 26 to levers 27 mounted at the sides of the side frames 1 and connected by a shaft 28. One of the levers 27 is provided with an extension to which is attached a connecting rod 29. The connecting rod 29 extends upwardly and is joined to a crank sprocket 30 mounted on a stub shaft 31. The crank sprocket 30 is connected by a chain drive 32 to a sprocket 33 mounted on the shaft 3 outwardly from the sprocket 14.

A supply tray or chute 34 is mounted above the side frames 1 with its rear end overhanging the forward side of the feed trough 21. The supply tray is supported on four rocker arms 35 which are adapted to be oscillated in a manner to be described hereinafter.

Located forwardly of the pitting roller 3 is a shaft 36 which carries a plurality of stripper knives 37. The stripper knives extend downwardly and forwardly to engage the forward undersides of the spacers 4 between the saws 5. The knives strip or remove pulp which would otherwise cling to and between the saws 5.

Below the pitting roller 3 is a pulp discharge hopper 38, the upper and forward end of which is located rearwardly of the vertical plane defined by the contacting surfaces of the rollers 3 and 8. The discharge hopper slopes downwardly and rearwardly from its upper or receiving end to a point clear of the side frames.

An oscillating pit discharge screen 41 is located between the side frames 1 with its rearward or receiving end under the receiving end of the pulp discharge hopper 38. The pits, on moving between the rollers 3 and 8, discharge more or less vertically downwardly and, therefore, fall into the pit discharge screen 41 instead of the pulp discharge hopper 38. The pit discharge screen 41 slopes forwardly and downwardly and is mounted on four upstanding rocker springs 42 supported from the side frames 1. Oscillating arms 43 are attached to the sides of the screen 41 at its rearward end and extend forwardly to eccentrics 44 mounted on the counter shafts 17. By this means the pit discharge screen 41 is caused to oscillate or vibrate, so as to work the pits toward the forward or discharge end of the screen, however, at a slow rate, so that the juice can drain through the screen 41. The screen is preferably formed by a plurality of longitudinally extending bars.

A bracket 45 is secured to the screen 41 and is joined by a link 46 to the lever arm 47 which forms an extension of one of the rocker arms 35, so that the supply tray 34 is oscillated indirectly by the eccentrics 44.

A juice drain pan 48 is located under the screen 41 and slopes forwardly and rearwardly to a point below the discharge end of the hopper 38, so that the juice and the pulp are discharged into a common receptacle. If it is desired to separate the juice from the pulp, the discharge end of the pan 48 may terminate short of the hopper.

In order to guide the pits and at the same time deflect the juice onto the oscillating screen 41, side deflectors 49 are secured to the side frames 1 and are positioned with their lower ends overhanging the ends of the pit discharge screen, which, of course, is provided with upturned side walls. In addition, a cross deflector 50 extends between the side frames 1 forwardly of, and below, the pressure roller 8.

Figure 5:
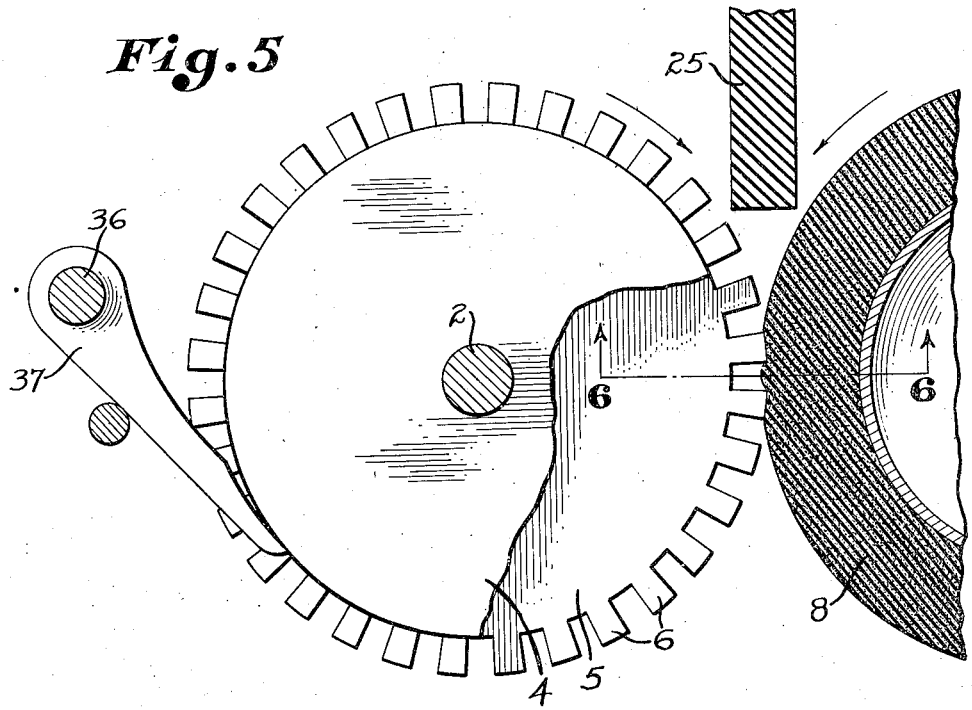
Fig. 5 is an enlarged detailed view of the pitting and pressure rollers taken in the same plane as Fig. 4.
Figure 6:
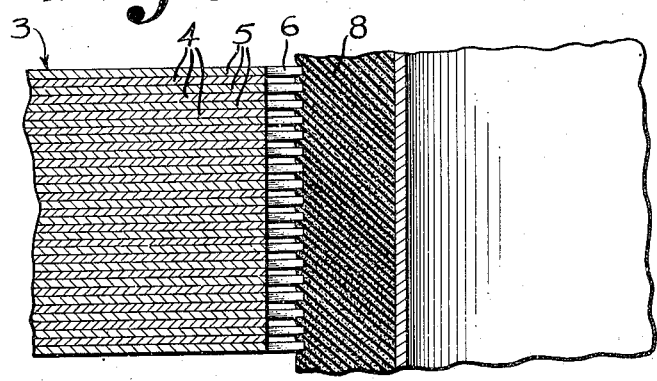
Fig. 6 is a fragmentary sectional view thereof taken through 6—6 of Fig. 5.

Operation of our fruit pitting machine is as follows:

The fruit is fed into the supply tray 34 and, by reason of the oscillatory movement of the supply tray, is shaken into the feed trough 21. The fruit falls between the rollers 3 and 8, and by aid of the feeding blade 25 is forced between the rollers as these rollers are rotated in the direction of the arrows shown in Fig. 5. The pressure roller 8 is relatively soft and yieldable, so that the fruit is to some extent pressed therein, and as the opposite side of the fruit is engaged by the saws, the fruit rolls in a manner to cause the saw teeth to strip the pulp or meat of the fruit free of the seed. The pulp or meat tends to cling to, and between, the saws 5 and is, therefore, carried rearwardly until stripped from the saws by the knives 37, so as to drop into the pulp discharge hopper 38. The seeds, and juice which is separated from the pulp in the course of pitting the fruit, drops vertically onto the oscillating pit discharge screen 41. The pits roll forwardly on the screen into a suitable receptacle, not shown, while the juice drains downwardly through the screen into the pan 48 and is ultimately discharged with the contents of the pulp discharge hopper 38 into a common receptacle, also not shown.

Many other embodiments of the invention may be resorted to without departing from the spirit of the invention.

We claim:

1. A fruit pitting machine comprising: a pair of tangentially disposed rollers, their adjacent sides traveling in the same direction, one of said rollers being yieldable, the other including spaced circumferential rows of teeth, said teeth adapted to rip the pulp from the seed of fruit passing between said rollers and tending to carry the pulp as the roller continues its rotation; said rollers together defining a trough for receiving fruit whereby the fruit tends to wedge between said rollers; a resilient plunger mounted above the trough for pressing the fruit into wedging contact with said rollers; stripper means for engaging and removing the pulp held by said teeth; a discharge chute for catching the pulp as removed by said stripper means; and means for receiving the juice and seeds of the fruit upon issuance from between said rollers, and straining the juice from said seeds.

2. A fruit pitting machine comprising: a yieldable roller; a multiple saw roller engagable with said yielding roller; means driving said rollers whereby the contacting peripheries thereof move downwardly in unison, said rollers adapted to receive fruit above their contacting portions, discharge the juice and seeds downwardly after passing between said rollers, said saw roller tending to retain the pulp of the fruit on its periphery; means for receiving and separating the juice and seeds; means for stripping pulp from said saw roller; a receiver for pulp stripped from said saw roller; a hopper above said rollers, the upper portions of said rollers forming the bottom thereof; and a reciprocating feeding blade adapted to crowd fruit between said rollers.

3. A fruit pitting machine comprising: a yieldable roller; a multiple saw roller engagable with said yieldable roller; means driving said rollers whereby the contacting peripheries thereof move downwardly in unison, said rollers adapted to receive fruit above their contacting portions, discharge the juice and seeds downwardly after passing between said rollers, said saw roller tending to retain the pulp of the fruit on its periphery; an oscillating screen disposed under the contacting portions of said rollers to receive the fruit juice and seeds therefrom; a hopper above said rollers, the upper portions of said rollers forming the bottom thereof; a reciprocating feeding blade adapted to crowd fruit between said rollers; a feed chute for delivering fruit to said hopper; and means linking said feed chute with said oscillating screen whereby said feed chute oscillates in unison therewith.

4. A fruit pitting machine comprising: a yieldable roller; a multiple saw roller engagable with said yieldable roller; means driving said rollers whereby the contacting peripheries thereof move downwardly in unison, said rollers adapted to receive fruit above their contacting portions, discharge the juice and seeds downwardly after passing between said rollers, said saw roller tending to retain the pulp of the fruit on its periphery;

an oscillating screen disposed under the contacting portions of said rollers to receive the fruit juice and seeds therefrom; upright leaf springs supporting the corners of said screen; an eccentric drive for oscillating said screen; means for receiving and separating the juice and seeds; means for stripping pulp from said raw roller; a receiver for pulp stripped from said saw roller; a hopper above said rollers, the upper portions of said rollers forming the bottom thereof; and a reciprocating feeding blade adapted to crowd fruit between said rollers.

CARROLL E. COLE.
EDWARD J. DERDERIAN.

REFERENCES CITED

The following references are of record in the file of this patent:

UNITED STATES PATENTS

| Number | Name | Date |
|---|---|---|
| 56,721 | Crosby | July 31, 1866 |
| 156,467 | Sims | Nov. 3, 1874 |
| 951,897 | Anderson | Mar. 15, 1910 |
| 1,097,213 | Crine | May 19, 1914 |
| 2,202,540 | Stelter | May 28, 1940 |
| 2,360,964 | Moroni | Oct. 24, 1944 |
| 2,374,456 | Ravndal et al. | Apr. 24, 1945 |